United States Patent
Bemment (10) Patent No.: US 11,994,075 B2
(45) Date of Patent: *May 28, 2024

(54) GEARED GAS TURBINE ENGINE (71) Applicant: ROLLS-ROYCE PLC, London (GB)

(72) Inventor: Craig W Bemment, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/135,526

(22) Filed: Apr. 17, 2023

(65) Prior Publication Data
US 2023/0272753 A1 Aug. 31, 2023

Related U.S. Application Data (63) Continuation of application No. 17/870,270, filed on Jul. 21, 2022, now Pat. No. 11,761,384, which is a
(Continued)

(30) Foreign Application Priority Data

May 23, 2019 (GB) .................................... 1907256

(51) Int. Cl.
F02C 9/24 (2006.01)
F01D 19/00 (2006.01)
(Continued)

(52) U.S. Cl.
CPC ................. *F02C 9/24* (2013.01); *F01D 19/00* (2013.01); *F02C 9/18* (2013.01); *F02C 7/268* (2013.01); *F02C 7/36* (2013.01)

(58) Field of Classification Search
CPC .... F02C 9/24; F02C 7/268; F02C 7/36; F01D 19/00
See application file for complete search history.

(56) References Cited

U.S. PATENT DOCUMENTS 4,435,958 A 3/1984 Klees
6,254,341 B1 7/2001 Ackerman et al.
(Continued)

FOREIGN PATENT DOCUMENTS

EP 2 857 655 A1 4/2015

OTHER PUBLICATIONS

Hannes Wemming, "Validation and Integration of a Rubber Engine Model Into an MDO Environment" Master Thesis, Linkoping University Institute of Technology Sweden, pp. 1-90 (Oct. 2010).
(Continued)

*Primary Examiner* — David P. Olynick
(74) *Attorney, Agent, or Firm* — Oliff PLC (57) ABSTRACT A gas turbine engine for an aircraft and a method of operating a gas turbine engine on an aircraft. Embodiments disclosed include a gas turbine engine for an aircraft including: an engine core has a turbine, a compressor, and a core shaft; a fan located upstream of the engine core, the fan has a plurality of fan blades; a nacelle surrounding the engine core and defining a bypass duct and bypass exhaust nozzle; and a gearbox that receives an input from the core shaft and outputs drive to the fan wherein the gas turbine engine is configured such that a jet velocity ratio of a first jet velocity exiting from the bypass exhaust nozzle to a second jet velocity exiting from an exhaust nozzle of the engine core at idle conditions is greater by a factor of 2 or more than the jet velocity ratio at maximum take-off conditions.

20 Claims, 3 Drawing Sheets

Related U.S. Application Data continuation of application No. 17/411,617, filed on Aug. 25, 2021, now Pat. No. 11,434,832, which is a continuation of application No. 16/526,221, filed on Jul. 30, 2019, now Pat. No. 11,131,250.

(51) Int. Cl.
  *F02C 7/268*  (2006.01)
  *F02C 7/36*   (2006.01)
  *F02C 9/18*   (2006.01)

(56) References Cited

U.S. PATENT DOCUMENTS

| | | |
|---|---|---|
| 2008/0138197 A1 | 6/2008 | Green et al. |
| 2012/0324903 A1 | 12/2012 | Dewis et al. |
| 2013/0192200 A1 | 8/2013 | Kupratis et al. |
| 2014/0090388 A1 | 4/2014 | Hasel |
| 2014/0205438 A1 | 7/2014 | Hasel |
| 2014/0248129 A1 | 9/2014 | Merry et al. |
| 2014/0363276 A1 | 12/2014 | Vetters et al. |
| 2015/0027101 A1 | 1/2015 | Hasel |
| 2015/0096303 A1 | 4/2015 | Schwarz et al. |
| 2016/0010590 A1 | 1/2016 | Rolt |
| 2016/0061051 A1 | 3/2016 | Schwarz et al. |
| 2016/0230584 A1 | 8/2016 | Grover |
| 2017/0175675 A1 | 6/2017 | Sabnis |
| 2017/0191548 A1 | 7/2017 | Fisher et al. |
| 2018/0355804 A1 | 12/2018 | Miller et al. |

OTHER PUBLICATIONS

Shray Benawra, et al., "Performance Cycle Analysis on Turbofan Engine PVV400", Proceedings of the 34th Chinese Control Conference, Hangzhou China, pp. 8844-8849 (Jul. 2015).

Hill and Peterson, "Mechanics and Thermodynamics of Propulsion", Second Edition, ISBN 0-201-14659-2, 1992, pp. 170-171, 184-185 (1992—year sufficiently early that month is not at issue).

P.P. Walsh and P. Fletcher. "Gas Turbine Performance", Blackwell Science Ltd, pp. 187, 189 and 222, 1998 (year of publication sufficiently early that the month is not relevant).

Nicholas Cumpsty. "Jet Propulsion", The Press Syndicate of The University of Cambridge, p. 61, 1997 (year of publication sufficiently early that the month is not relevant).

Nicholas Cumpsty, "Jet Propulsion," The Press Syndicate of The University of Cambridge, pp. 101-106 (1997—year sufficiently early that month not at issue).

P.P. Walsh and P. Fletcher, "Gas Turbine Performance," Blackwell Science Ltd, pp. 215-216 (1998—year sufficiently early that month not at issue).

Hill and Peterson, "Mechanics and Thermodynamics of Propulsion", Second Edition, Reading: Addison-Wesley Publishing Company, 1992, p. 374 (1992—year sufficiently early that month is not at issue).

"The GE90—An Introduction: GE90_Engine_Data.pdf" Web page <http://web.stanford.edu/-cantwell/ AA283_Course_Material/GE90_Engine_Data.pdf>, 18 pages, Mar. 22, 2015. Retrieved from Internet Archive Wayback Machine on Mar. 23, 2020 (2015).

Philip R. Gliebe and Bangalore A. Janardan, "Ultra High Bypass Engine Aeroacoustic Study", NASA/CR-2003-212525, Oct. 2003.

P. Walsh and P. Fletcher, "Gas Turbine Performance," Blackwell Science Ltd, pp. 159-163, 2004 (2004—year sufficiently early that month not at issue).

Joachim Kurzke, "Fundamental Differences Between Conventional and Geared Turbofans," Conference Paper, Jan. 2009.

Hill and Peterson, ":Mechanics and Thermodynamics of Propulsion," Second Edition, ISBN-0-201-14659-2, 1992, pp. 175-189, 184-185 (Year: 1992) (Year: 1992) (Year: 1992).

Abhijit Guha, "Optimum Fan Pressure Ratio for Bypass Engines With Separate or Mixed Exhaust Streams," Journal of Propulsion And Power, vol. 17, No. 5, Sep.-Oct. 2001. (Year: 2001).

Konstantinos G. Kyprianidis et al., "Multi-Disciplinary Analysis of a Geared Fan Intercooled Core Aero-Engine," GT2013-95474, Proceedings of ASME Turbo Expo 2013, Jun. 3-7, 2013.

H. Zimmermann et al., "A Numerical Investigation Into the Nozzle Flow of High By-Pass Turbofans," MTU Motoren-und Turbinen-Union Munchen GmbH Munich, Germany, 92-GT-10, Copyright © 1992 by ASME (Year: 1992).

"Specific Thrust" Web page <https://www.grc.nasa.gov/www/k-12/airplane/specth.html>, 3 pages, Nov. 16, 2016, retrieved from Internet Archive Wayback Machine on Sep. 25, 2021 (Year: 2016).

"General Thrust Equation" Web page, <https://www.grc.nasa.gov/www/k-12/airplane/thrsteq.html>, 5 pages, Apr. 17, 2017, retrieved from Internet Archive Wayback Machine on Sep. 25, 2021 (Year: 2017).

Saravanamuttoo, H., et al., GFC (2001). Gas Turbine Theory (5th ed.). Pearson Education, Ltd. HIH Saracanamuttoo, 2001, (2001—year sufficiently early that month not at issue).

P.P. Walsh and P. Fletcher. "Gas Turbine Performance", Blackwell Science Ltd, pp. 304-305, 2004 (year sufficiently early that month not at issue).

A. Dik, N. Biten, V. Zaccaria, I. Aslanidou, K.G. Kyprianidis, "Conceptual Design of a 3-Shaft Turbofan Engine with Reduced Fuel Consumption for 2025," Energy Procedia 142 (2017) 1728-1735 (2017).

Joachim Kurzke, "Gas Turbine Cycle Design Methodology: A Comparison of Parameter Variation with Numerical Optimization," 98-GT-343 (1998).

K. Zhao, S. Sahoo, K. Kyprianidis, J. Rantzer, M. Sielemann, "Off-design performance analysis of hybridised aircraft gas turbine," The Aeronautical Journal Dec. 2019 vol. 123 No. 1270 1999 (1999).

GEARED GAS TURBINE ENGINE

CROSS-REFERENCE TO RELATED APPLICATION(S)

This application is a continuation of U.S. application Ser. No. 17/870,270 filed Jul. 21, 2022, which is a continuation of U.S. application Ser. No. 17/411,617 filed Aug. 25, 2021, which is a continuation of U.S. application Ser. No. 16/526,221 filed Jul. 30, 2019, which is based on and claims priority under 35 U.S.C. 119 from Great Britain Patent Application No. 1907256.0 filed on May 23, 2019. The entire contents of the above applications are incorporated herein by reference.

The present disclosure relates to a gas turbine engine for an aircraft and a method of operating a gas turbine engine on an aircraft.

Turbofan gas turbine engines for aircraft propulsion have many design factors that affect the overall efficiency and power output or thrust. To enable a higher thrust while maintaining efficiency, a larger diameter fan may be used. As the diameter of the fan is increased, however, the required lower speed of the fan tends to conflict with the requirements of the turbine component the core shaft is connected to, typically a low pressure turbine. A more optimal combination can be achieved by including a gearbox between the fan and the core shaft, which allows the fan to operate at a reduced rotational speed, and therefore enables a larger size fan, while maintaining a high rotational speed for the low pressure turbine, enabling the overall diameter of the turbine to be reduced.

A high propulsive efficiency for a geared gas turbine engine is achieved through a high mass flow through the engine. This may be enabled in part by increasing the bypass ratio of the engine, which is the ratio between the mass flow rate of the bypass stream to the mass flow rate entering the engine core. To achieve a high bypass ratio with a larger fan while maintaining an optimum gearing ratio and fan speed, the size of the engine core, in particular the low pressure turbine, may need to increase, which would make integration of a larger fan engine underneath an aircraft wing more difficult. A general problem to be addressed therefore is how to achieve a high propulsive efficiency for a larger geared gas turbine engine while enabling the engine to be integrated with an aircraft.

According to a first aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades;
a nacelle surrounding the engine core and defining a bypass duct and bypass exhaust nozzle; and
a gearbox that receives an input from the core shaft and outputs drive to the fan so as to drive the fan at a lower rotational speed than the core shaft,
wherein the gas turbine engine is configured such that a jet velocity ratio of a first jet velocity exiting from the bypass exhaust nozzle to a second jet velocity exiting from an exhaust nozzle of the engine core at idle conditions is greater by a factor of around 2 or more than the jet velocity ratio at maximum take-off conditions.

A large variation in the jet velocity ratio between idle and maximum thrust enables the core and bypass streams to be managed to keep the engine operable with a high propulsive efficiency and a high bypass ratio. The large variation may be achieved by optimising the aerodynamic design of the fan and compressor components and/or by using other devices on the engine such as variable guide vanes and bleeds.

The jet velocity ratio, $R_J$, may be defined as:

$$R_J = \frac{V_B C_B}{V_C C_C \eta_{LPT} \eta_F}$$

where $V_B$ is the fully expanded first jet velocity, $C_B$ is a thrust coefficient of the bypass nozzle, $V_C$ is the fully expanded second jet velocity, $C_C$ is a thrust coefficient of the core exhaust nozzle, $\eta_{LPT}$ is an isentropic efficiency of a lowest pressure turbine of the engine core and $\eta_F$ is an isentropic efficiency of compression of air into the bypass duct by the fan. The fully expanded jet velocity may be defined as the axial jet velocity at the point where the exhaust jet has expanded to ambient pressure.

The gearbox may have a gear ratio of between around 2.5 and around 5, or may have a gear ratio within a range as defined in more detail below.

In some examples the gas turbine engine may be configured such that the jet velocity ratio is within a range from around 0.75 to around 1.3 at cruise conditions.

The gas turbine engine may be configured such that the jet velocity ratio at idle conditions is between around 2 and 3.

The gas turbine engine may be configured such that the jet velocity ratio at maximum take-off conditions is between around 0.75 and 1.3, or optionally between around 0.8 and 1.0.

The fan may have an outer diameter of between around 220 cm and around 290 cm, and optionally between around 230 cm and around 260 cm, or may have an outer diameter within a range as defined below.

The factor relating to the difference in jet velocity ratio between idle and maximum take-off conditions may be defined as $$\frac{Rj \text{ at Ground Idle}}{Rj \text{ at Take-Off}},$$

i.e. the jet velocity ratio at ground idle conditions divided by the jet velocity ratio at maximum take-off conditions.

The factor may be within a range of between around 2 and around 3.5, or optionally between around 2.1 and around 3.16. Above the lower limit of around 2 or 2.1 enables a reduced fuel burn and can be achieved by features such as a straighter fan root to maintain fan operability at a lower specific thrust achieved by a larger fan diameter in combination with a gearbox and a smaller engine core. Above the upper limit of around 3.16 or 3.5, the fan diameter required becomes increasingly unacceptable for a below-wing installation and would require further features to reduce drag.

Maximum take-off (MTO) conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust at ISA sea level pressure and temperature +15° C. with a fan inlet velocity of 0.25 Mn.

Idle conditions may be defined as operating the engine at around 4% of maximum take-off thrust at ISA sea level pressure and temperature conditions +15° C. Alternatively, idle conditions may be defined as operating the engine at a minimum steady state thrust under ISA sea level pressure and temperature conditions +15° C.

According to a second aspect there is provided a method of operating a gas turbine engine on an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives an input from the core shaft to drive the fan at a lower rotational speed than the core shaft, wherein the method comprises operating the gas turbine engine to provide propulsion such that a jet velocity ratio between a first jet velocity exiting from a bypass duct of the engine and a second jet velocity exiting from an exhaust nozzle of the engine core varies by more than a factor of two between idle and maximum thrust at ISA sea level conditions.

The various optional and advantageous features associated with the invention according to the first aspect may also apply to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

Maximum take-off thrust for the engine may be defined as operating the engine within 15 degrees C. of International Standard Atmosphere sea level pressure and temperature conditions at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust at ISA sea level pressure and temperature with a fan inlet velocity of 0.25 Mn.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein, and/or the maximum take-off conditions relate to the maximum take-off conditions of the aircraft.

According to an aspect, there is provided a method of operating an aircraft comprising a gas turbine engine as described and/or claimed herein. The operation according to this aspect may include (or may be) operation at the mid-cruise and/or maximum take-off of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figures 1, 2:
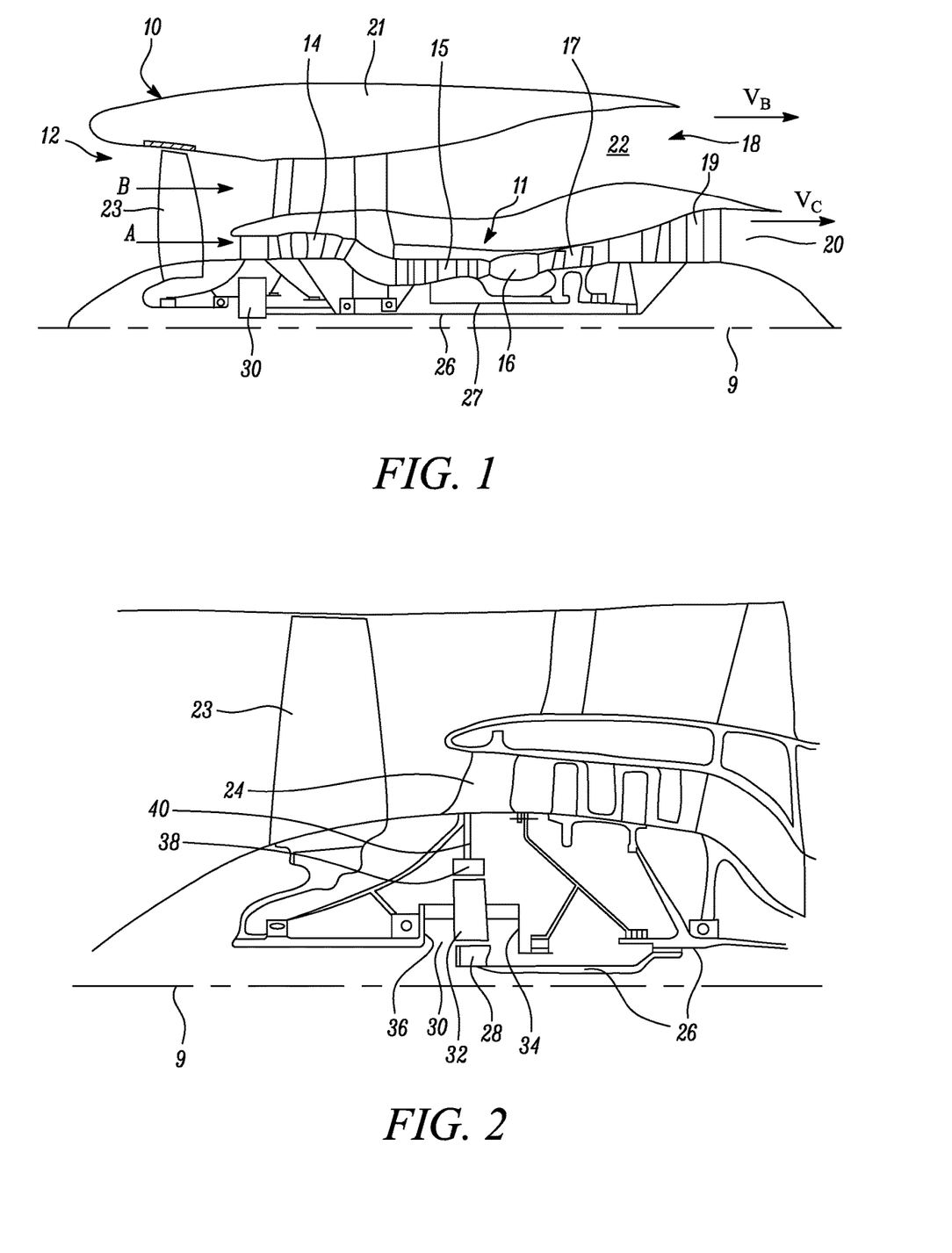
FIG. 1 is a sectional side view of a gas turbine engine.
FIG. 2 is a close up sectional side view of an upstream portion of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
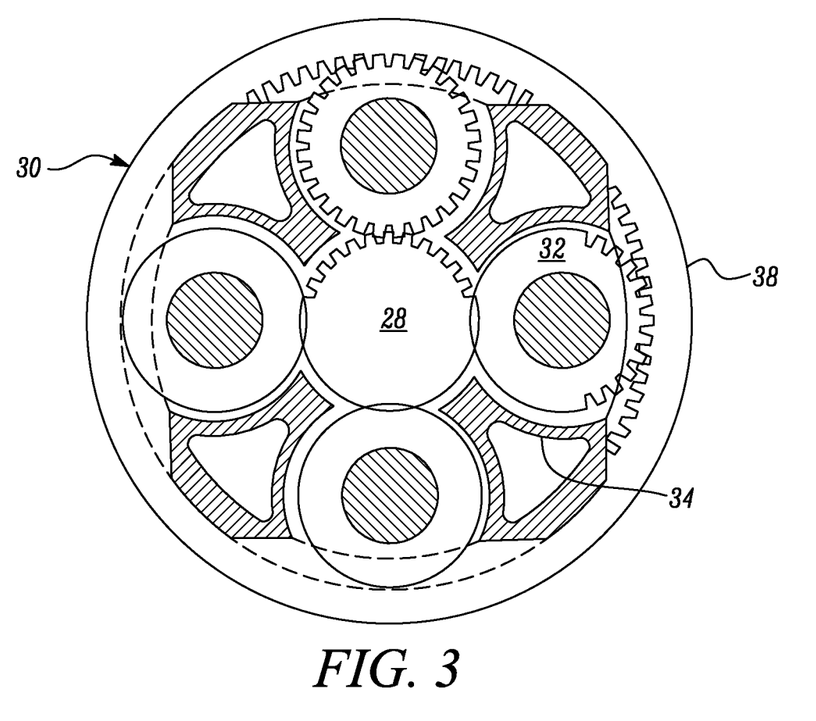
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
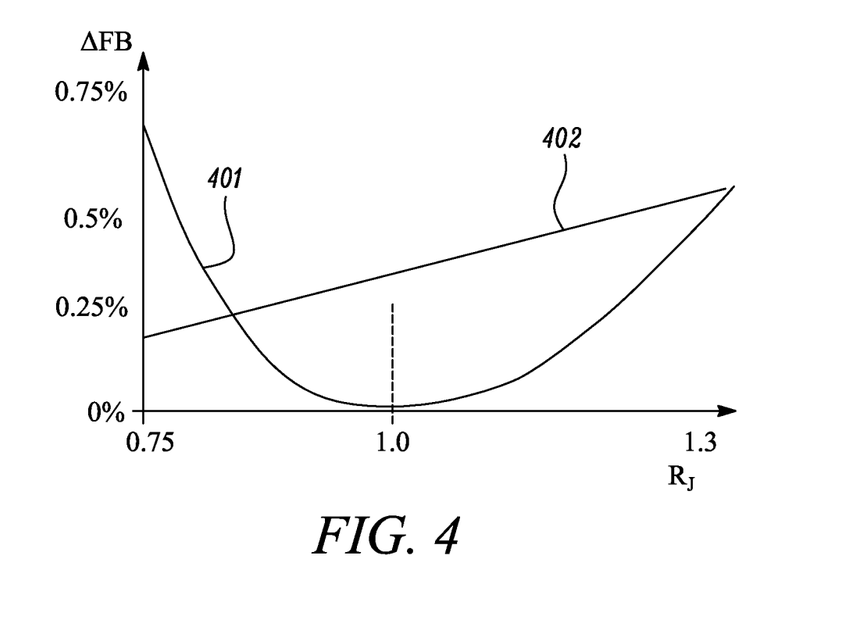
FIG. 4 is an example plot of change in fuel burn as a function of jet velocity ratio.

FIG. 4 illustrates an example plot of change in fuel burn, ΔFB, as a function of jet velocity ratio, $R_J$, other factors being constant. The change in fuel burn contribution from propulsive efficiency 401 is determined relative to an optimum value for the jet velocity ratio of around 1.0, with an increase in fuel burn both above and below this value. Factors that may affect the jet velocity ratio include the relative rotational speeds of the fan and turbine and the areas of the exhaust nozzles for the bypass and core exhausts. A lower gear ratio of the gearbox, i.e. a gear ratio of around 3.4 or lower, will tend to result in values for the jet velocity ratio of 1.0 or greater. To keep the fuel burn loss to within around 0.5% or less, it can be seen from FIG. 4 that the jet velocity ratio should be between around 1.0 and around 1.3. As the jet velocity ratio increases, the increase in fuel burn becomes greater. A further preferred upper limit for the jet velocity ratio is around 1.2, which keeps the increase in fuel burn to around 0.25-0.3%.

For a higher gearing ratio, i.e. around 3.3 to 3.4 and above, for example up to around 3.8 or in some cases even higher, the jet velocity ratio tends to be around 1.0 or below. As the jet velocity ratio decreases, the fuel burn contribution from propulsive efficiency 401 increases, and at a higher rate than for the portion above 1.0. To maintain this loss to within around 0.5%, it can be seen from FIG. 4 that the jet velocity ratio should be kept within around 0.8 to around 1.0, and for a ratio of around 0.75 and below, the fuel burn contribution from propulsive efficiency becomes dominant, rising to around 0.7% and above. A further preferred lower limit for the jet velocity ratio of around 0.85 or 0.90 may be used to keep the fuel burn contribution from propulsive efficiency to around 0.25% or below. However, further decreasing the jet velocity ratio enables a higher gear ratio to be used and/or decreases the pressure ratio across the IP turbine, thereby allowing for a smaller, faster and/or lighter IP turbine, reflected in a lower contribution to fuel burn loss 402 by the IP turbine. A range of around 0.75 to around 0.82 for the jet velocity ratio is thereby advantageous.

For a given set of gears making up an epicyclic gearbox, a planetary driving arrangement will produce a higher gearing ratio than a star driving arrangement. A star arrangement is therefore generally preferred in combination with a jet velocity ratio of around 1.0 and above, and a planetary arrangement for a jet velocity ratio of around 1.0 and below.

In a general aspect therefore, the gas turbine engine may be configured such that the jet velocity ratio is within a range from around 0.75 to around 1.3 at cruise conditions.

Figure 5:
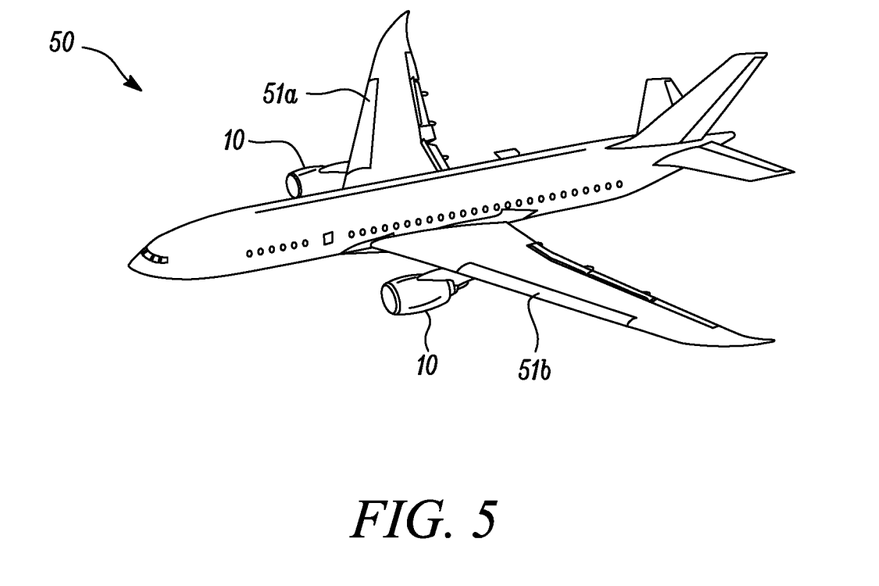
FIG. 5 is a schematic drawing of an aircraft having a gas turbine engine mounted thereon.

FIG. 5 illustrates an example aircraft 50 having a gas turbine engine 10 attached to each wing 51a, 51b thereof. When the aircraft is flying under cruise conditions, as defined herein, each gas turbine engine 10 operates such that a jet velocity ratio between a first jet velocity exiting from a bypass duct of the engine 10 and a second jet velocity exiting from an exhaust nozzle 20 of the engine core is within a range from around 0.75 to around 1.3.

Figure 6:
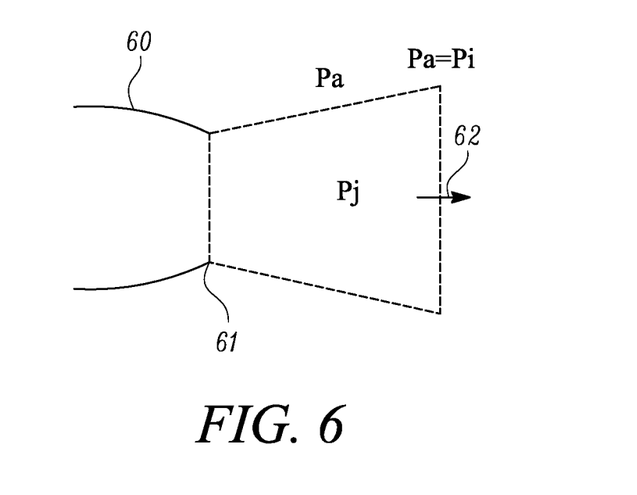
FIG. 6 is a schematic drawing illustrating the concept of a fully expanded jet velocity.

FIG. 6 illustrates an example exhaust nozzle 60 of a gas turbine engine. The pressure Pj at the exit or throat 61 of the exhaust nozzle 60 is greater than the ambient pressure Pa around the engine. At some distance away from the nozzle exit 61 the jet pressure will equalise with the ambient pressure, i.e. Pj=Pa. The fully expanded jet velocity is defined as the jet velocity 62 at this point, i.e. the jet velocity along the axis of the engine at a minimum distance from the exhaust nozzle where the pressure is equal to ambient pressure.

Parameters that may be adjusted to achieve a jet velocity ratio within the desired range may include the LPT blade exit angle, LPT exit area, and the LPT rotation speed.

The following table illustrates example parameters for two engine examples, example 1 being for a relatively small, or lower power, engine and example 2 for a relatively large, or higher power, engine. A small engine may for example have a fan diameter of between around 200 and 280 cm and/or a maximum net thrust of between around 160 and 250 kN or as defined elsewhere herein. A large engine may for example have a fan diameter of between around 310 and 380 cm and/or a maximum net thrust of between around 310 and 450 kN or as defined elsewhere herein.

| Parameter | Example 1 (small engine) | Example 2 (large engine) |
|---|---|---|
| Fan diameter (cm) | 215 | 320 |
| LPT Exit Total Pressure at maximum flow (kPa) | 130 | 130 |
| Maximum LPT Exit Mass Flow (kg/s) | 50 | 100 |
| LPT Final Rotor Area (m²) | 0.38 or less, for example 0.25 to 0.38 | 0.75 or less, for example 0.5 to 0.75 |
| ESS Inlet Total Pressure at maximum flow (kPa) | 140 | 140 |
| ESS Inlet Mass Flow (kg/s) | 50 | 100 |
| ESS Inlet Rotor Area (m²) | 0.275 or greater, for example 0.27-0.3 | 0.55 or greater, for example 0.55-0.6 |

The above parameters relating to LPT exit total pressure at maximum flow, maximum LPT exit mass flow and LPT final rotor area together determine the exit flow velocity of the LPT, i.e. the flow velocity at an exit of the engine core. The ESS inlet total pressure at maximum flow, maximum ESS inlet mass flow and ESS inlet rotor area together determine the velocity at the inlet of the engine core. The axial exhaust flow velocity from the bypass exhaust nozzle may be determined, at least in part, by the area of the bypass exhaust nozzle outlet.

In order to achieve a jet velocity ratio within the desired range, the fan may be provided with features such as a straighter fan root. The compressors, in particular the high pressure compressor, may be provided with features to manage their operability to allow the compressors to operate at a low power required to meet the defined ratios, which may for example include devices such as variable guide vanes. This changes the flow incidence onto the blades and helps to maintain an operability margin preventing the compressor from surging or stalling when operating at lower speeds.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of operating a gas turbine engine on an aircraft, the gas turbine engine comprising:
   an engine core comprising a turbine, a combustor, a compressor, and a core shaft connecting the turbine to the compressor;
   a fan located upstream of the engine core, the fan comprising a plurality of fan blades;
   a nacelle surrounding the engine core and defining a bypass duct and bypass exhaust nozzle; and
   a gearbox that receives an input from the core shaft and outputs drive to the fan so as to drive the fan at a lower rotational speed than the core shaft,
   wherein the method comprises operating the gas turbine engine to provide propulsion such that a jet velocity ratio, $R_J$, of a first jet velocity exiting from the bypass exhaust nozzle to a second jet velocity exiting from an exhaust nozzle of the engine core is defined as:

$$R_J = \frac{V_B C_B}{V_C C_C \eta_{LPT} \eta_F}$$

where $V_B$ is a fully expanded first jet velocity, $C_B$ is a thrust coefficient of the bypass exhaust nozzle, $V_C$ is a fully expanded second jet velocity, $C_C$ is a thrust coefficient of the engine core exhaust nozzle, $\eta_{LPT}$ is an isentropic efficiency of a lowest pressure turbine of the engine core and $\eta_F$ is an isentropic efficiency of a fan tip; and
   the jet velocity ratio, $R_J$, is between around 0.75 and 1.3 at maximum take-off conditions.

2. The method of claim 1, wherein the jet velocity ratio $R_J$, is between around 0.8 and 1.0 at the maximum take-off conditions.

3. The method of claim 1, wherein the temperature of the flow at the exit of the combustor, at a position immediately upstream of a first turbine vane, is at least 1800K at the maximum take-off conditions.

4. The method of claim 1,
   wherein a temperature of a flow at an exit of the combustor, at a position immediately upstream of a first turbine vane, is at least 1850K at the maximum take-off conditions.

5. The method of claim 1,
   wherein a temperature of a flow at an exit of the combustor, at a position immediately upstream of a first turbine vane, is at least 1900K at the maximum take-off conditions.

6. The method of claim 1,
   wherein a temperature of a flow at an exit of the combustor, at a position immediately upstream of a first turbine vane, is at least 1950K at the maximum take-off conditions.

7. The method of claim 4, wherein the temperature of the flow at the exit of the combustor, at the position immediately upstream of the first turbine vane, is less than 2000K at the maximum take-off conditions.

8. The method of claim 1, wherein the jet velocity ratio, $R_J$, is between around 2 and 3 at idle conditions.

9. The method of claim 1, wherein the jet velocity ratio, $R_J$, is between around 0.75 and 1.3 at cruise conditions.

10. The method of claim 1,
    wherein a gear ratio of the gearbox is between 3.1 and 3.3; a fan tip loading defined as $dH/Uti_p^2$ is between 0.28 and 0.31 at cruise conditions, where dH is an enthalpy rise across the fan and $Uti_p$ is a translational velocity of the leading edge of the fan tip; and a bypass ratio, defined as a ratio of a mass flow rate of a flow through the bypass duct to a mass flow rate of a flow through the core at cruise conditions, is in a range of from 11.5 to 13.5.

11. The method of claim 10, wherein an overall pressure ratio defined as a ratio of a stagnation pressure upstream of the fan to a stagnation pressure at an exit of a highest pressure compressor is between 40 and 55 at the cruise conditions.

12. The method of claim 1, wherein the fan has an outer diameter of around 220 cm.

13. A method of operating a gas turbine engine on an aircraft, the gas turbine engine comprising:
    an engine core comprising a turbine, a combustor, a compressor, and a core shaft connecting the turbine to the compressor;
    a fan located upstream of the engine core, the fan comprising a plurality of fan blades;
    a nacelle surrounding the engine core and defining a bypass duct and bypass exhaust nozzle; and
    a gearbox that receives an input from the core shaft and outputs drive to the fan so as to drive the fan at a lower rotational speed than the core shaft,
    wherein the method comprises operating the gas turbine engine to provide propulsion such that a jet velocity ratio, $R_J$, of a first jet velocity exiting from the bypass exhaust nozzle to a second jet velocity exiting from an exhaust nozzle of the engine core is defined as:

$$R_J = \frac{V_B C_B}{V_C C_C \eta_{LPT} \eta_F}$$

where $V_B$ is a fully expanded first jet velocity, $C_B$ is a thrust coefficient of the bypass exhaust nozzle, $V_C$ is a fully expanded second jet velocity, $C_C$ is a thrust coefficient of the engine core exhaust nozzle, $\eta_{LPT}$ is an isentropic efficiency of a lowest pressure turbine of the engine core and $\eta_F$ is an isentropic efficiency of a fan tip; and
    the jet velocity ratio, $R_J$, is between around 2 and 3 at idle conditions.

14. The method of claim 13, wherein the jet velocity ratio, $R_J$, is between around 0.75 and 1.3 at cruise conditions.

15. The method of claim 13,
    wherein a fan tip loading defined as $dH/Utip^2$ is between 0.28 and 0.35 at cruise conditions, where dH is an enthalpy rise across the fan and $Uti_p$ is a translational velocity of a leading edge of the fan tip.

16. The method of claim 13, wherein a specific thrust, defined as a net thrust of the engine divided by a total mass flow through the engine, is between 80 $Nkg^{-1}s$ and 95 $Nkg^{-1}s$ at cruise conditions.

17. The method of claim 13,
wherein a temperature of a flow at an exit of the combustor, at a position immediately upstream of a first turbine vane, is at least 1600K at cruise conditions.

18. The method of claim 13,
wherein a temperature of a flow at an exit of the combustor, at a position immediately upstream of a first turbine vane, is between 1600K and 1650K at cruise conditions.

19. The method of claim 13, wherein the fan comprises 22 or 24 fan blades.

20. The method of claim 13,
wherein a gear ratio of the gearbox is between 3.1 and 3.4; a fan tip loading defined as $dH/Uti_p^2$ is between 0.28 and 0.32 at cruise conditions, where dH is an enthalpy rise across the fan and $U_{tip}$ is a translational velocity of a leading edge of the fan tip; a bypass ratio, defined as a ratio of a mass flow rate of a flow through the bypass duct to a mass flow rate of a flow through the core at cruise conditions, is in a range of from 11.5 to 14; an overall pressure ratio defined as a ratio of a stagnation pressure upstream of the fan to a stagnation pressure at an exit of a highest pressure compressor is between 40 and 55 at the cruise conditions; a ratio of a radius of a fan blade of the fan at a hub to a radius of the fan blade at the tip is in a range of 0.27 to 0.31; and a specific thrust, defined as a net thrust of the engine divided by a total mass flow through the engine, is between 80 s and 95 s at cruise conditions.

\* \* \* \* \*